United States Patent
Hudson

(10) Patent No.: US 10,480,334 B2
(45) Date of Patent: Nov. 19, 2019

(54) AIRFOIL WITH GEOMETRICALLY SEGMENTED COATING SECTION

(71) Applicant: United Technologies Corporation, Farmington, CT (US)

(72) Inventor: Eric A. Hudson, Harwinton, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 319 days.

(21) Appl. No.: 15/354,118

(22) Filed: Nov. 17, 2016

(65) Prior Publication Data

US 2018/0135441 A1 May 17, 2018

(51) Int. Cl.
| | |
|---|---|
| F01D 5/28 | (2006.01) |
| F01D 9/02 | (2006.01) |
| F02C 3/04 | (2006.01) |
| F04D 29/02 | (2006.01) |
| F04D 29/32 | (2006.01) |
| F04D 29/54 | (2006.01) |
| F01D 5/14 | (2006.01) |

(52) U.S. Cl.
CPC .......... *F01D 9/02* (2013.01); *F01D 5/14* (2013.01); *F01D 5/288* (2013.01); *F02C 3/04* (2013.01); *F04D 29/023* (2013.01); *F04D 29/324* (2013.01); *F04D 29/542* (2013.01); *F05D 2220/32* (2013.01); *F05D 2230/90* (2013.01); *F05D 2240/124* (2013.01); *F05D 2240/306* (2013.01); *F05D 2240/35* (2013.01); *F05D 2250/20* (2013.01); *F05D 2250/28* (2013.01); *F05D 2300/17* (2013.01); *F05D 2300/20* (2013.01); *F05D 2300/608* (2013.01)

(58) Field of Classification Search
CPC .................. F01D 5/288; F01D 5/14
See application file for complete search history.

(56) References Cited

U.S. PATENT DOCUMENTS

| | | |
|---|---|---|
| 3,215,511 A | 11/1965 | Chisholm |
| 4,137,008 A | 1/1979 | Grant et al. |
| 4,247,259 A | 1/1981 | Saboe et al. |
| 4,396,349 A | 8/1983 | Hueber |
| 4,914,794 A | 4/1990 | Strangman |
| 5,358,379 A | 10/1994 | Pepperman et al. |

(Continued)

FOREIGN PATENT DOCUMENTS

| | | |
|---|---|---|
| EP | 0158307 | 10/1985 |
| EP | 0661415 | 7/1995 |

(Continued)

OTHER PUBLICATIONS

European Search Report for European Patent Application No. 17202397.0 completed Mar. 9, 2018.

(Continued)

*Primary Examiner* — Christopher Verdier
*Assistant Examiner* — Michael L Sehn
(74) *Attorney, Agent, or Firm* — Carlson, Gaskey & Olds, P.C.

(57) ABSTRACT

An airfoil includes an airfoil body that has a geometrically segmented coating section. The geometrically segmented coating section includes a wall having an outer side. The outer side has an array of cells, and there is a coating disposed in the array of cells.

20 Claims, 3 Drawing Sheets

(56) References Cited

U.S. PATENT DOCUMENTS

| | | |
|---|---|---|
| 5,538,380 A | 7/1996 | Norton et al. |
| 5,681,616 A | 10/1997 | Gupta et al. |
| 5,705,231 A | 1/1998 | Nissley et al. |
| 5,951,892 A | 9/1999 | Wolfla et al. |
| 6,000,906 A | 12/1999 | Draskovich |
| 6,102,656 A | 8/2000 | Nissley et al. |
| 6,224,963 B1 | 5/2001 | Strangman |
| 6,316,078 B1 | 11/2001 | Smialek |
| 6,503,574 B1 | 1/2003 | Skelly et al. |
| 6,514,046 B1 | 2/2003 | Morrison et al. |
| 6,543,996 B2 | 4/2003 | Koschier |
| 6,703,137 B2 | 3/2004 | Subramanian |
| 6,709,230 B2 | 3/2004 | Morrison et al. |
| 6,846,574 B2 | 1/2005 | Subramanian |
| 7,104,756 B2 | 9/2006 | Harding et al. |
| 7,316,539 B2 | 1/2008 | Campbell |
| 7,326,030 B2 | 2/2008 | Albrecht et al. |
| 7,435,058 B2 | 10/2008 | Campbell et al. |
| 7,452,182 B2 | 11/2008 | Vance et al. |
| 7,520,725 B1 | 4/2009 | Liang |
| 7,670,116 B1 | 3/2010 | Wilson, Jr. et al. |
| 7,963,745 B1 | 6/2011 | Liang |
| 8,079,806 B2 | 12/2011 | Tholen et al. |
| 8,182,208 B2 | 5/2012 | Bridges, Jr. et al. |
| 8,197,211 B1 | 6/2012 | Liang |
| 8,202,043 B2 | 6/2012 | McCaffrey |
| 8,251,651 B2 | 8/2012 | Propheter-Hinckley et al. |
| 8,366,392 B1 | 2/2013 | Laing |
| 8,480,366 B2 | 7/2013 | Malecki et al. |
| 8,506,243 B2 | 8/2013 | Strock et al. |
| 8,821,124 B2 | 9/2014 | Viens et al. |
| 8,852,720 B2 * | 10/2014 | Bolcavage ............... F01D 5/288 416/97 R |
| 2005/0036891 A1 * | 2/2005 | Spitsberg ............... C23C 14/083 416/241 R |
| 2008/0159850 A1 | 7/2008 | Tholen et al. |
| 2010/0136258 A1 | 6/2010 | Strock et al. |
| 2011/0097538 A1 | 4/2011 | Bolcavage et al. |
| 2012/0156054 A1 * | 6/2012 | Lacy ..................... C23C 28/321 416/96 R |
| 2016/0090851 A1 | 3/2016 | Carr et al. |

FOREIGN PATENT DOCUMENTS

| | | |
|---|---|---|
| EP | 0764764 | 3/1997 |
| EP | 1764481 | 3/2007 |
| EP | 2105579 | 9/2009 |
| EP | 2853688 | 4/2015 |
| GB | 2272453 | 5/1994 |
| JP | 61066802 | 4/1986 |
| JP | 05321602 | 12/1993 |
| WO | 2016133579 | 8/2016 |

OTHER PUBLICATIONS

U.S. Appl. No. 13/429,474, filed Mar. 26, 2012.
U.S. Appl. No. 14/659,718, filed Mar. 17, 2015.
U.S. Appl. No. 14/812,668, filed Jul. 29, 2015.

* cited by examiner

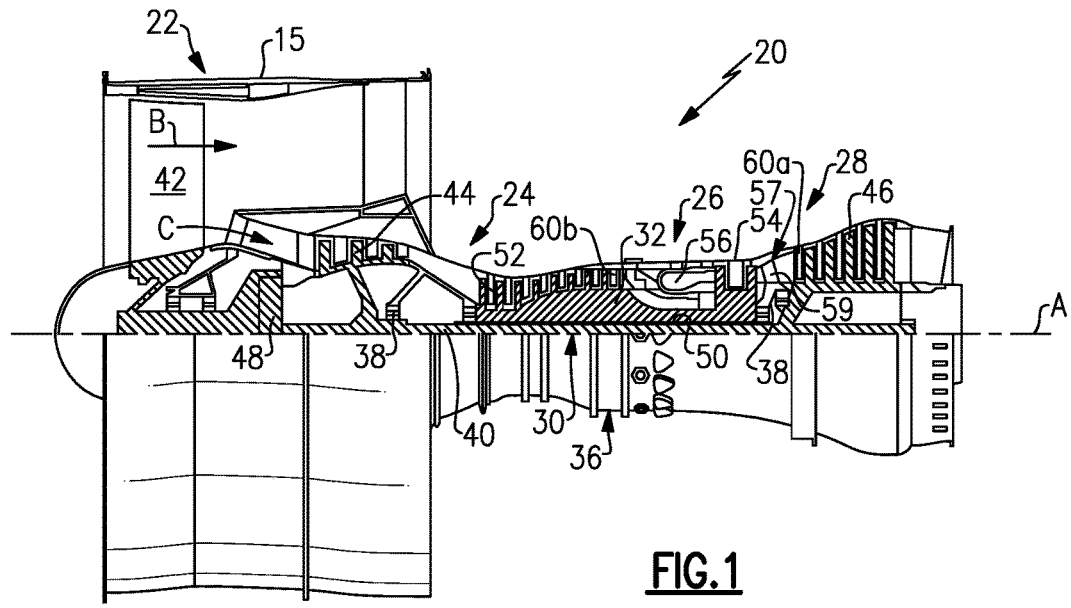
FIG.1
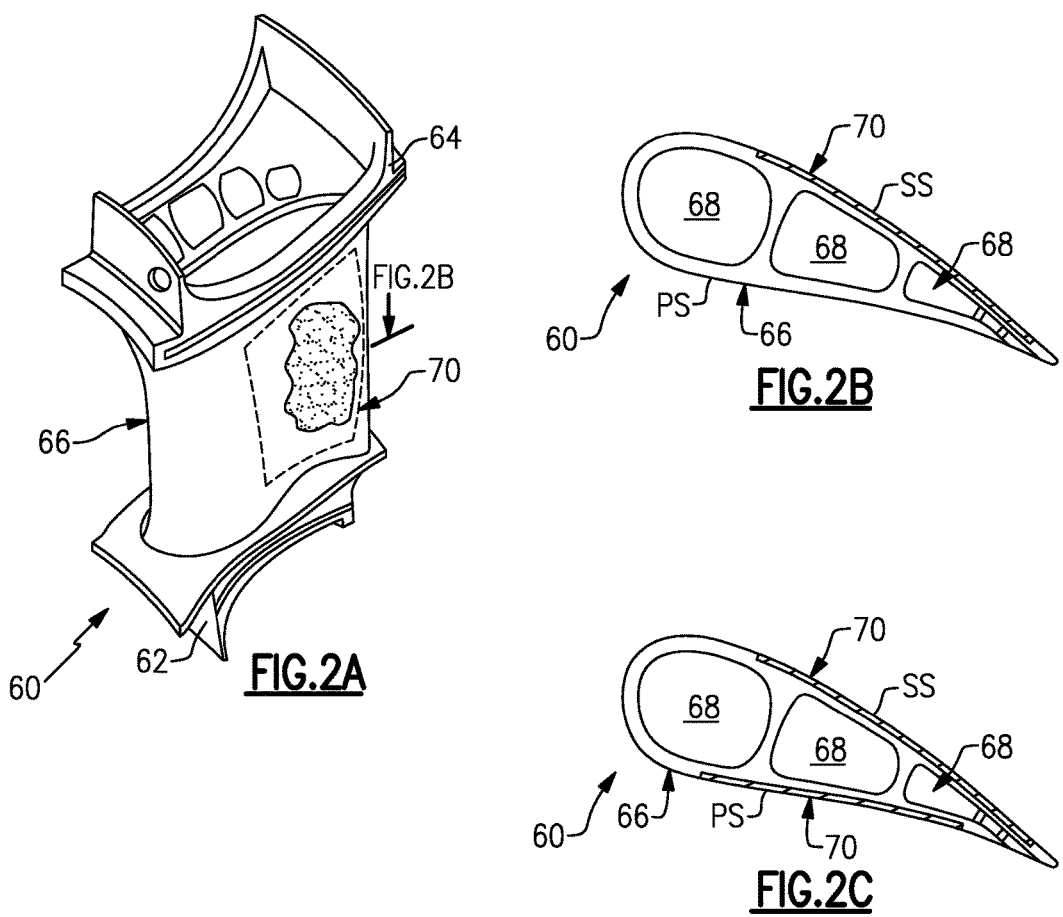
FIG.2A
FIG.2B
FIG.2C

AIRFOIL WITH GEOMETRICALLY SEGMENTED COATING SECTION

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An airfoil according to an example of the present disclosure includes an airfoil body that has a geometrically segmented coating section. The geometrically segmented coating section has a wall that includes an outer side. The outer side includes an array of cells, and a coating is disposed in the array of cells.

In a further embodiment of any of the foregoing embodiments, the cells are polygonal.

In a further embodiment of any of the foregoing embodiments, the coating substantially fills the cells.

In a further embodiment of any of the foregoing embodiments, the coating fully embeds the cells.

In a further embodiment of any of the foregoing embodiments, the airfoil body is an airfoil section.

In a further embodiment of any of the foregoing embodiments, geometrically segmented coating section is on a suction side of the airfoil section.

In a further embodiment of any of the foregoing embodiments, geometrically segmented coating section is on a pressure side of the airfoil section.

In a further embodiment of any of the foregoing embodiments, geometrically segmented coating section is on a portion of the airfoil section, and an adjacent portion of the airfoil section includes the coating but excludes the cells.

In a further embodiment of any of the foregoing embodiments, the airfoil body is a platform.

In a further embodiment of any of the foregoing embodiments, the coating is substantially formed of ceramic.

In a further embodiment of any of the foregoing embodiments, the coating has a laminar microstructure.

In a further embodiment of any of the foregoing embodiments, the ceramic includes yttria and the wall is formed of an alloy.

A gas turbine engine according to an example of the present disclosure includes a compressor section, a combustor in fluid communication with the compressor section, and a turbine section in fluid communication with the combustor. One of the turbine section or the compressor section including an airfoil having an airfoil body. The airfoil body includes a geometrically segmented coating section. The geometrically segmented coating section includes a wall that has an outer side. The outer side includes an array of cells, and a coating is disposed in the array of cells.

In a further embodiment of any of the foregoing embodiments, the cells are polygonal and the coating substantially fills the cells.

In a further embodiment of any of the foregoing embodiments, the airfoil body is an airfoil section.

In a further embodiment of any of the foregoing embodiments, geometrically segmented coating section is on a suction side of the airfoil section.

In a further embodiment of any of the foregoing embodiments, geometrically segmented coating section is on a portion of the airfoil section, and an adjacent portion of the airfoil section includes the coating but excludes the cells.

In a further embodiment of any of the foregoing embodiments, the coating is substantially formed of ceramic and has a laminar microstructure.

In a further embodiment of any of the foregoing embodiments, the ceramic includes yttria and the wall is formed of an alloy.

In a further embodiment of any of the foregoing embodiments, the geometrically segmented coating section is on a suction side of the airfoil section.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 illustrates an example gas turbine engine.

FIG. 2A illustrates an example airfoil in the gas turbine engine.

FIG. 2B illustrates a sectioned view of the airfoil of FIG. 2A.

FIG. 2C illustrates a sectioned view of another example airfoil.

DETAILED DESCRIPTION

Figure 3A:
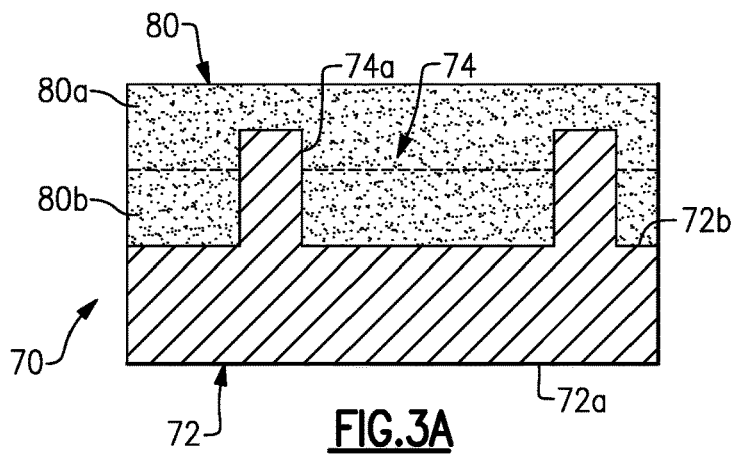
FIG. 3A illustrates a sectioned view through a segmented coating section of the airfoil.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }^\circ \text{ R})/(518.7^\circ \text{ R})]^{0.5}$. The "Low corrected fan tip speed" as disclosed herein according to one non-limiting embodiment is less than about 1150 ft/second.

In gas turbine engines air is often bled from the compressor for cooling alloy components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures. In particular, thermal resistance can be enhanced at the compressor exit and turbine inlet.

FIG. 2A illustrates one such component, namely an airfoil 60. FIG. 2B illustrates a sectioned view of the airfoil 60. For instance, the airfoil 60 can be a turbine vane, as represented at 60a in FIG. 1, or a compressor vane, as represented at 60b in FIG. 1. As will be appreciated, although the examples herein are described in the context of a vane, this disclosure is not limited to vanes, and the examples may also be applicable to blades or other airfoils that are exposed to high temperatures.

The airfoil 60 includes a body which generally includes inner and outer platforms 62/64 and an airfoil section 66 that extends radially between the inner and outer platforms 62/64. The airfoil section 66 may be hollow and can include one or more internal passages 68. A passage can include a cavity, a channel, or the like.

To enhance the temperature resistance capability of the airfoil 60, the airfoil 60 includes a geometric segmented coating section 70. The coating section 70 may be integral with the airfoil section 66, but could alternatively be a segment or panel that forms a portion of the airfoil section 66. In this example, the coating section 70 is located on a suction side (SS) of the airfoil section 66. Alternatively or additionally, a coating section 70 could also be provided on the pressure side (PS) of the airfoil section 66, as depicted in a modified example in FIG. 2C, on a leading end (LE) of the airfoil section 66, or on one or both of the platforms 62/64 (see FIG. 2A). As will be described in further detail below, the coating section 70 includes a segmented structure to enhance temperature resistance capability of the airfoil 60.

Figures 3B, 4:
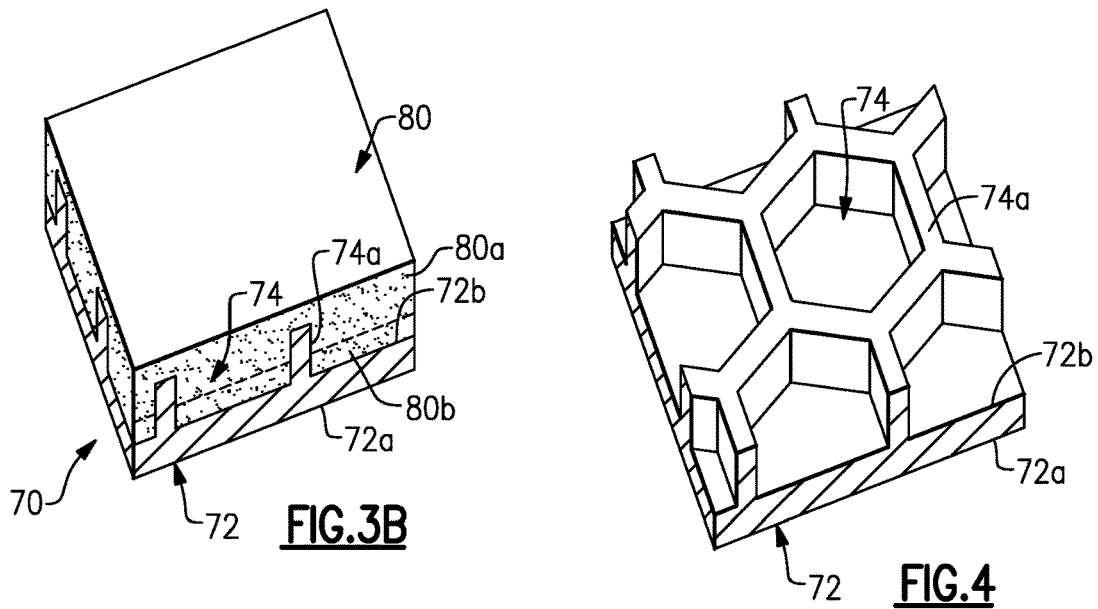
FIG. 3B illustrates a perspective view of the segmented coating section of FIG. 3A.
FIG. 4 illustrates a wall of the segmented coating section, without the coating.

FIG. 3A illustrates a sectioned view through a representative portion of the coating section 70, and FIG. 3B illustrates a sectioned perspective view of the coating section 70. The coating section 70 includes a wall 72. The wall 72 includes a first side 72a that will most typically border the passage 68 and a second side 72b that is opposite the first side 72a. The second side 72b includes an array of cells 74 defined by cell sidewalls 74a. The array is a repeating geometric pattern of one or more cell geometries. In this example, the cell sidewalls 74a have a uniform thickness. As shown in the isolated view of the wall 72 in FIG. 4, the cells 74 are hexagonal. Alternatively, the cells 74 are circular, ovular, other polygonal geometry, or mixed cell geometries.

A coating 80 is disposed in the array of cells 74. The cells 74 mechanically facilitate bonding of the coating 80 on the wall 72. The coating 80 is a barrier coating, such as a thermal barrier or environmental barrier, which is formed of a ceramic material. A ceramic material is a compound of metallic or metalloid elements bonded with nonmetallic elements or metalloid elements primarily in ionic or covalent bonds. Example ceramic materials may include, but are not limited to, oxides, carbides, nitrides, borides, silicides, and combinations thereof. The coating 80 may be a monolayer coating but more typically will be a multi-layer coating. For instance, the coating 80 has a first coating layer 80a and a second coating layer 80b. In this example, the second coating layer 80b is a topcoat.

The ceramic material of the coating 80 provides thermal and/or environmental resistance. As an example, the ceramic material may include or may be yttria stabilized with zirconia, hafnia, and/or gadolinia, gadolinia zirconate, molybdate, alumina, or combinations thereof.

The coating 80 may also include a bond coat for attaching the ceramic material to the wall 72 and cells 74. The wall 72 and cells 74 may be formed of an alloy. Example alloys may include, but are not limited to, nickel alloys, cobalt alloys, a nickel alloy coated with cobalt or cobalt alloy, or non-nickel alloys that do not substantially react with ceramic. The bond coat may include a nickel alloy, platinum, gold, silver, or MCrAlY, where the M includes at least one of nickel, cobalt, iron, or combinations thereof.

The cell sidewalls 74a also facilitate reducing internal stresses in the coating 80 that may occur from sintering at relatively high surface temperatures during use in the engine 20. The sintering may result in partial melting, densification, and diffusional shrinkage of the coating 80 and thereby induce internal stresses. The cell sidewalls 74a serve to produce faults in at least the portion of the coating 80. The faults provide locations for releasing energy associated with the internal stresses (e.g., reducing shear and radial stresses). That is, the energy associated with the internal stresses may be dissipated in the faults such that there is less energy available for causing delamination cracking between the coating 80 and the underlying wall 72.

The coating section 70 may be formed using several different fabrication techniques. As an example, the wall 72 may be fabricated by investment casting, additive manufacturing, brazing, or combinations thereof, but is not limited to such techniques. For instance, the cells 74 can be separately fabricated and brazed to the remaining portion of the wall 72, which can be investment cast or additively fabricated. Alternatively, the cells 74 can be formed by other techniques, such as depositing an alloy coating and removing sections of the alloy coating by machining, electro-discharge machining (EDM), or other removal process.

Figure 5:
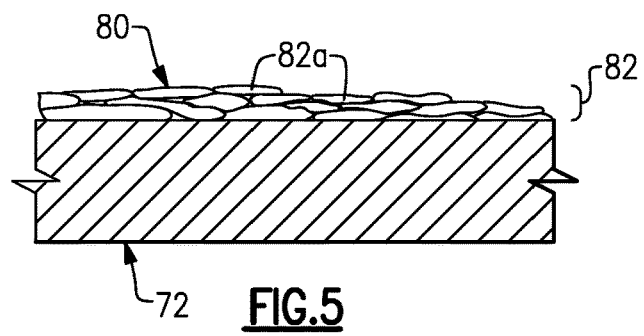
FIG. 5 illustrates a laminar microstructure of a coating.

To produce the coating 80, ceramic coating material is deposited over the cells 74. The deposition process can include, but is not limited to, plasma spray or physical vapor deposition. In one example, plasma spray is used to produce a more durable version of the coating 80. For instance, as shown in FIG. 5, the coating 80 has a laminar microstructure 82. The laminar microstructure 82 includes grains 82a of ceramic material that have a high aspect ratio. The laminar microstructure 82 is a product of the plasma spray process, in which droplets of melted or partially melted ceramic material are sprayed onto the cells 74. Upon impact, the droplets flatten and solidify, yielding the laminar microstructure 82. There may be voids or pores among the grains 82a; however, the coating 80 is substantially fully dense. For instance, the coating 80 has a porosity of less than 15%.

The ceramic coating material fills or substantially fills the cells 74 and is deposited in a thickness that is greater than the height of the cell sidewalls 74a. At this stage, the surface of the coating may have contours from the underlying cells 74. If such contours are undesired, the surface may be machined, ground, or abraded flat. For instance, the surface is reduced down to or close to the tops of the cell sidewalls 74a.

Figure 6:
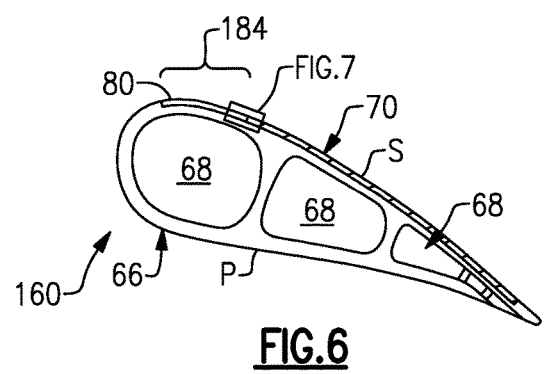
FIG. 6 illustrates a sectioned view of another example airfoil that has a coated portion without cells adjacent to a geometrically segmented section.
Figure 7:
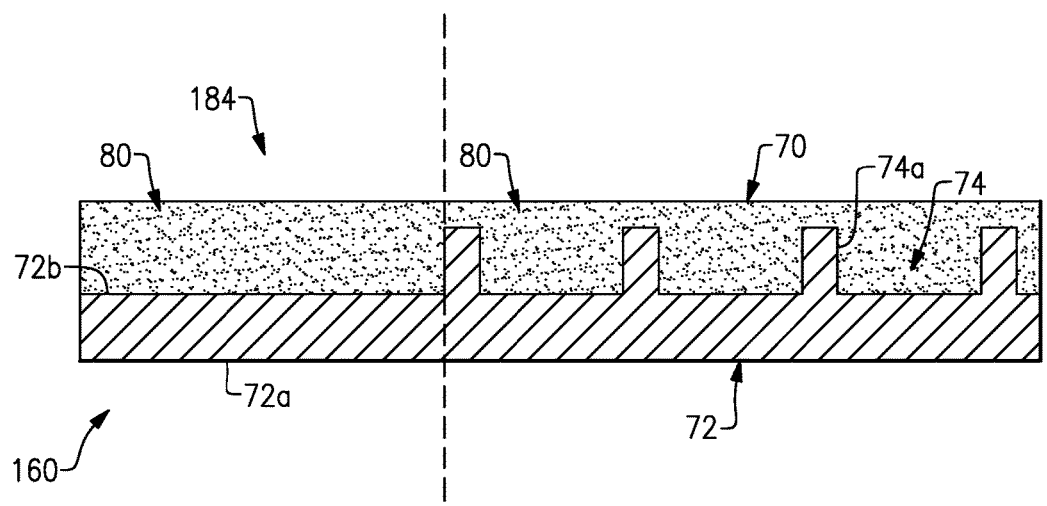
FIG. 7 illustrates the coated portion and geometrically segmented section of the airfoil of FIG. 6.

FIG. 6 illustrates a representative section of another example airfoil 160. In this disclosure, like reference numerals designate like elements where appropriate and reference numerals with the addition of one-hundred or multiples thereof designate modified elements that are understood to incorporate the same features and benefits of the corresponding elements. As also shown in FIG. 7, the segmented coating section 70 is on a portion of the airfoil section 66, and an adjacent portion 184 of the airfoil section 66 includes the coating 80 but excludes the cells 74. Rather, the second side 72b of the wall 72 in the portion 184 is relatively smooth and contains no cells. Such an arrangement of the coating section 70 and adjacent portion 184 may be used on locations of an airfoil that have differing thermal exposures. As an example, all or much of the suction side (SS) of the airfoil section 66 may be subjected to higher temperature conditions than other portions of the suction side (SS) or other portions of the airfoil section 66. The coating section 70 may be used in locations with higher temperature conditions, while the portion 184 is used at lower temperature locations. The cells 74 provide additional mechanical bonding and spallation resistance of the coating 80 at the higher temperature locations. In turn, greater spallation resistance may reduce the need for bleed air for cooling or enable use of higher temperature bleed air that is less of an efficiency penalty.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
   an airfoil body having a geometrically segmented coating section, the geometrically segmented coating section including
      a wall having an outer side, the outer side including an array of cells that are closed-sided, and
      a coating disposed in the array of cells, wherein the geometrically segmented coating section is on a portion of the airfoil section, and an adjacent portion of the airfoil section includes the coating but excludes the cells.

2. The airfoil as recited in claim 1, wherein the cells are polygonal.

3. The airfoil as recited in claim 1, wherein the coating substantially fills the cells.

4. The airfoil as recited in claim 1, wherein the coating fully embeds the cells.

5. The airfoil as recited in claim 1, wherein the airfoil body is an airfoil section.

6. The airfoil as recited in claim 5, wherein the geometrically segmented coating section is on a suction side of the airfoil section.

7. The airfoil as recited in claim 5, wherein the geometrically segmented coating section is on a pressure side of the airfoil section.

8. The airfoil as recited in claim 1, wherein the airfoil body is a platform.

9. The airfoil as recited in claim 1, wherein the coating is substantially formed of ceramic.

10. The airfoil as recited in claim 9, wherein the coating has a laminar microstructure.

11. The airfoil as recited in claim 10, wherein the ceramic includes yttria and the wall is formed of an alloy.

12. The airfoil as recited in claim 1, wherein adjacent cells of the array of cells share a common uniform thickness wall.

13. The airfoil as recited in claim 1, wherein the coating is flat such that it excludes contours from the cells.

14. A gas turbine engine comprising:
   a compressor section;
   a combustor in fluid communication with the compressor section; and
   a turbine section in fluid communication with the combustor,
   at least one of the turbine section or the compressor section including an airfoil having an airfoil body, the airfoil body including a geometrically segmented coating section, the geometrically segmented coating section including
      a wall having an outer side, the outer side including an array of cells that are closed-sided, and
      a coating disposed in the array of cells, wherein the geometrically segmented coating section is on a portion of the airfoil section, and an adjacent portion of the airfoil section includes the coating but excludes the cells.

15. The gas turbine engine as recited in claim 14, wherein the cells are polygonal and the coating substantially fills the cells.

16. The gas turbine engine as recited in claim 14, wherein the airfoil body is an airfoil section.

17. The gas turbine engine as recited in claim 16, wherein the geometrically segmented coating section is on a suction side of the airfoil section.

18. The gas turbine engine as recited in claim 14, wherein the coating is substantially formed of ceramic and has a laminar microstructure.

19. The gas turbine engine component as recited in claim 18, wherein the ceramic includes yttria and the wall is formed of an alloy.

20. The gas turbine engine component as recited in claim 19, wherein the geometrically segmented coating section is on a suction side of the airfoil section.

* * * * *